Patented Aug. 26, 1930

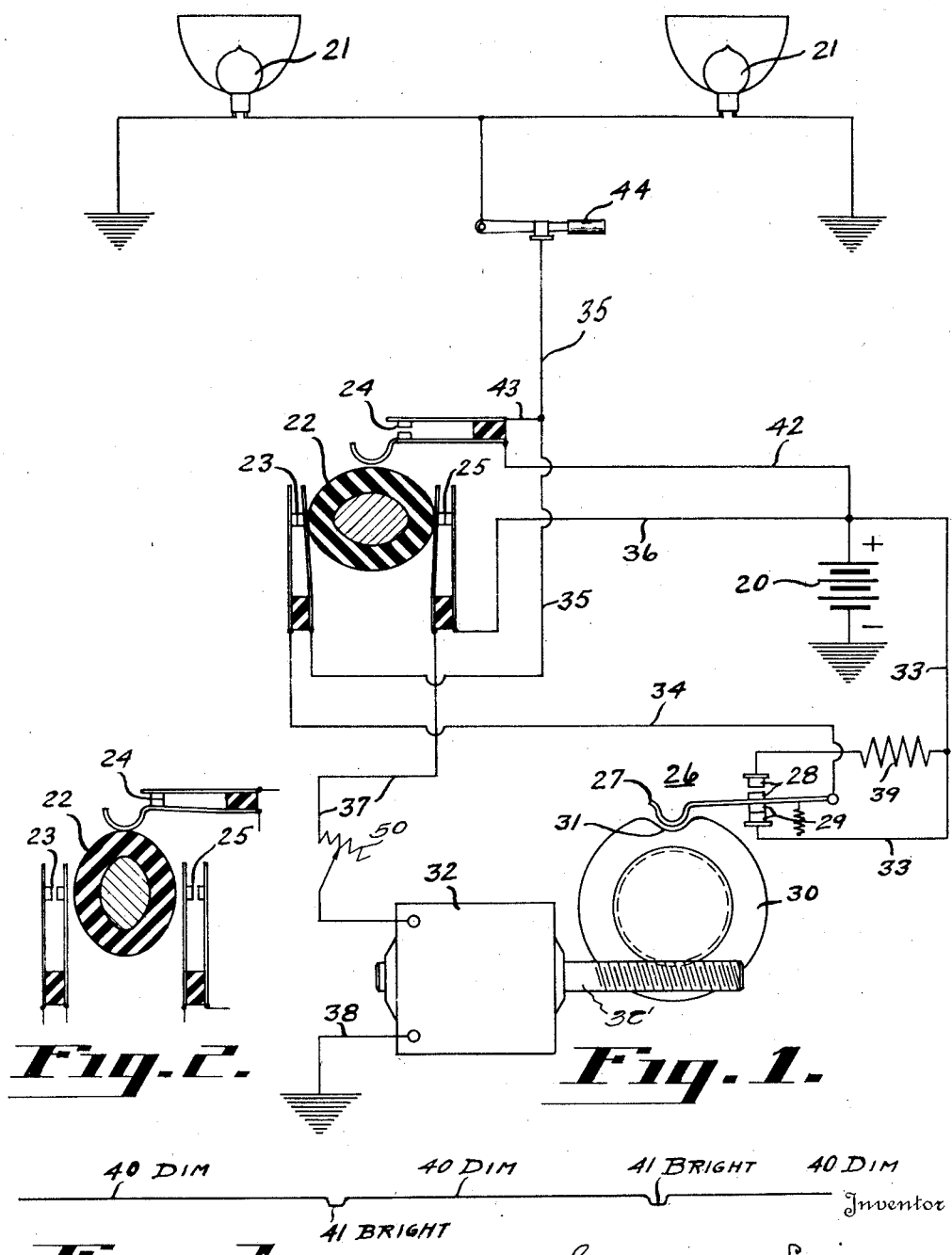

1,774,101

UNITED STATES PATENT OFFICE

GEORGE W. LORIMER, OF TROY, OHIO, ASSIGNOR, BY DIRECT AND MESNE ASSIGNMENTS, OF ONE-HALF TO BINGHAM-LORIMER MANUFACTURING COMPANY, OF TROY, OHIO, A CORPORATION OF DELAWARE, AND ONE-HALF TO DOUGLAS E. BONNER, OF NEW YORK, N. Y.

AUTOMATIC HEADLIGHT DIMMER

Application filed March 19, 1925. Serial No. 16,851.

The present invention relates to a lighting apparatus or source of light and particularly a lighting apparatus suitable for use as the head-light of an automobile or the like.

One of the principal objects of the invention is to provide a lighting system, particularly designed for use with automobiles and the like, and which is adapted for dimming to avoid blinding the driver of an approaching machine, while at the same time insuring adequate illumination for the vehicle, or the like, carrying the lighting system.

Another object of the invention is to provide a source of light adapted to illuminate a distant object and having means for automatically varying the intensity of illumination of the object from said source of light.

Still another object of the invention is to provide a headlight for an automobile or the like, having means whereby the illumination from the headlight may be maintained at a high intensity, or at a low intensity, or at a varying intensity.

Other and further objects and advantages of the present invention will be apparent from the following description taken in connection with the accompanying drawings, in which—

Fig. 1 is a schematic diagram of the present invention;

Fig. 2 shows a control switch of Fig. 1 in a second operating position; and

Fig. 3 is a diagram showing the variation in intensity of illumination which may be automatically produced by the present invention.

In the operation of motor vehicles on the highways at night it is generally desirable to maintain the headlights of the automobile in such a condition that the light emitted therefrom is not so strong as to blind the driver of an approaching automobile, for when the driver of an automobile is blinded in this manner he must either stop his machine or reduce the speed thereof to avoid incurring the danger of an accident such for example as striking a pedestrain or running off the road. This difficulty may be overcome to some extent by dimming the headlights but this has the disadvantage that the illumination from the dimmed headlights, is so little that the driver of the machine carrying the dimmed headlights is himself in danger of striking pedestrians or unlighted objects on the highway. As a result of these conditions the drivers of automobiles often maintain their headlights at full intensity in order to protect themselves and totally ignore the danger to which the driver of the oncoming automobile is subject.

The present invention effectively overcomes the difficulties of illumination by providing a lighting system in which the headlights normally operate in the usual manner and which is provided with a switch whereby the lights may be dimmed, but at the same time periodically restored to full intensity of illumination thereby enabling the operator to obtain recurrent full vision views of the road without seriously inconveniencing or endangering the drivers of oncoming automobiles.

While the invention is of general application, for purposes of easier description and as constituting a preferred embodiment thereof it is illustrated and described as incorporated in a lighting system for an automobile. In the drawing 20 designates a battery or other suitable source of electrical energy and 21 designates the headlights or electric lamps which are adapted to form the headlights of an automobile, said headlights being connected with the battery 20 by means of suitable electrical circuits which will now be described.

Reference character 22 denotes a switch control member adapted to control the opening and closing of electrical switches 23, 24 and 25, which in turn function to control the intensity of the illumination,—that is, the brightness of the headlights 21. The arrangement is such that when the switch control member 22 is in the position shown in Fig. 1 then the switches 23 and 25 are held closed, while the switch 24 remains open. However, when the switch control member 22 is rotated to the position shown in Fig. 2 then the switches 23 and 25 are open while the switch 24 is held closed.

Reference character 26 denotes a switch comprising a switch arm 27 adapted to be moved to respectively close or open the switch contacts 28 and 29. The switch arm 27 is normally biased to a position to maintain the contacts 29 closed and the contacts 28 open, and this may be accomplished by forming the switch arm 27 of spring material or in any other suitable manner. The switch arm 27 may be operated to either of its positions by means of a circular cam or drum 30 having a suitable dwell or depression 31 formed therein. As herein shown the relation of the cam or drum 30 to the switch arm 27 is such that when the depression 31 comes under the switch arm 27, then the contacts 29 are closed, and when the switch arm 27 rides up on the outer or cylindrical surface of the drum 30 then the contacts 28 are closed. It will be understood that the relative time of closure of the switch contacts 28 and 29 may be varied as desired by increasing or decreasing the length of the depression 31 relative to the length of the cylindrical surface of the drum 30; and the actual periods of closure may be lengthened or shortened by varying the rate of rotation of the drum 30. The drum or cam 30 may be driven by any suitable means preferably a worm gear and pinion 32' driven by an electric motor 32 which may be operated from the battery 20 or from any other source of power.

In the operation of the device to give "dimming" and with the parts in the positions shown in Fig. 1 the headlight circuit or the circuit for conducting current to the headlights extends from the positive side of the battery through wire 33, switch contacts 29, switch blade 27, wire 34, switch 23 and wire 35 to the headlights 21, and thence to ground. At the same time a motor circuit is closed from the positive side of the battery 20 through wire 36, switch 25 and wire 37 to motor 32 and thence through wire 38 to the ground. With the member 22 positioned as in Fig. 1, then, the motor 32 thus operates the drum or cam 30 to intermittently open and close the contacts 28 and 29. In the position of the drum 30 illustrated in the drawing the headlight circuit is closed through the contacts 29 and the headlights are bright, but when the switch arm 27 rides up on the cylindrical surface of the drum 30, as the drum is rotated by the motor 32, then the headlight circuit is closed through the contacts 28 and a resistance 39 is inserted in the circuit so as to dim the headlights.

Comparing the relative circumferential lengths of the depression 31 and the cylindrical surface of the drum 30 it will be apparent that during dimming the headlights burn brightly for only a comparatively short time. The relative bright and dim operation of the headlights is indicated diagrammatically by the line in Fig. 3 in which the portions 40 indicate the length of time that the headlights are dimmed and the portions 41 indicate the length of time that the headlights are bright.

As herein shown the ratio of dim to bright operation is approximately 20 to 1 so that if an automobile covers a distance of say 200 feet while the lights are dimmed, the lights will then be flashed for a time corresponding to a movement of 10 feet by the automobile, which is about the most satisfactory setting for an automobile speed of thirty to thirty-five miles per hour. Obviously the period of dim illumination is of sustained duration as it exists for a time far exceeding the small fractional part of a second in which vision may persist, so that the road actually appears dark to the driver during the periods of dim illumination. Of course the relative period of bright to dim may be set as desired. Control of the relative period of bright and dim may be had by including in the motor circuit a resistance 50 which may be actuated as desired to vary the motor speed. It may be stated as generally desirable that the glimpse of the highway which is obtained during the bright operation of the headlights should be such as to reveal any objects which might be on the highway and which might therefore be struck by the automobile during the next succeeding period of dim operation, or in other words, the distance covered while the lights are dim should be no greater than the distance that could be viewed by the operator during the preceding interval of bright operation.

So long as the switch control member 22 is in the position shown in Fig. 1, the motor 32 will operate to flash the headlights 21. Should it be desired to discontinue the flashing of the headlights, this may be done by turning the switch control member 22 to the position shown in Fig. 2 thereby opening the motor circuit at the switch 25 and also opening the headlight circuit at the switch 23. At the same time the main headlight circuit is closed from the positive side of the battery through wire 42, switch 24, wire 43 and wire 35 to the headlights 21, and thence to ground. This headlight circuit through switch 24 is independent of the operation of the motor 32, and it is apparent that irrespective of the position in which the cam or drum 30 may come to rest, the headlights 21 may receive full current through the main headlight circuit. A manually operable switch is provided at 44 to control the headlight circuits independently of the other means herein disclosed, and such manually operable switch 44 may be of any well known type to open or close the headlight circuit, or to otherwise control the same.

From the foregoing it will be apparent that the present invention provides a simple means for accomplishing the stated objects of the invention. It should be understood that while the apparatus herein disclosed provides means for automatically and intermittently varying the electrical conditions of the headlight circuit and the intensity of the beam of light, the present invention contemplates broadly any means for automatically and intermittently increasing or decreasing the illumination of a distant object or a given portion of the highway over which the automobile may be traveling.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an automatic headlight dimmer adapted to be mounted on a motor vehicle or the like, a road-illuminating light adapted to project a beam of light to illuminate a distant object in advance of the vehicle, a power supply for said light, and means acting upon the power supply of the road-illuminating light at intervals of sustained duration for automatically quickly changing the intensity of illumination of said distant object.

2. In an automatic headlight dimmer, a source of light adapted to be mounted at the front of an automobile to project a beam of light forwardly for alluminating an object, and means for automatically intermittently increasing the intensity of illumination of said object from said source of light at predetermined time intervals of sustained duration.

3. In an automatic headlight dimmer, a source of light adapted to be mounted on a vehicle or the like to project a beam of light for illuminating an object, and means for automatically intermittently changing the intensity of illumination of said object from said source of light at predetermined time intervals. said means operating to maintain bright illumination of said object for short intervals and reduced illumination thereof for longer intervals of sustained duration.

4. In an automobile headlight dimmer, a source of light adapted to be mounted on a vehicle or the like to project a beam of light for illuminating a distant object, automatic means for intermittently changing the intensity of illumination of said object from said source of light, and means for continuously maintaining relatively high intensity of said illumination.

5. In an automobile headlight dimmer, a source of light adapted to be maintained on a vehicle or the like to project a beam of light for illuminating a distant object, automatic means for intermittently varying the intensity of said beam of light, and means for continuously maintaining a relatively high beam intensity.

6. In an automatic headlight dimmer adapted to be mounted on a motor vehicle or the like, a pair of road-illuminating lights adapted to project a pair of beams of light to illuminate a distant object in advance of the vehicle, and means for automatically equally controlling the intensity of said beams of light whereby to change the intensity of illumination of said distant object through cycles of sustained time duration.

7. In an automatic headlight dimmer adapted to be mounted on a motor vehicle or the like, a road-illuminating light adapted to project a beam of light to illuminate the road in advance of the vehicle, a source of electrical energy, an electrical circuit connecting said source of electrical energy with said road-illuminating light, and means acting upon said electrical circuit for intermittently changing the intensity of illumination of the road from said light through cycles of sustained time duration.

8. In an automatic headlight dimmer adapted for an automobile or the like, a road-illuminating headlight adapted to project a beam of light to illuminate a distant object in advance of the vehicle, an electrical circuit leading thereto, a source of electrical energy connected with said circuit, power driven means for automatically varying the electrical condition of said circuit for changing the intensity of illumination of said distant object, means for controlling the operation of said power driven means, and means for maintaining an electrical condition of said circuit to cause bright illumination by said headlight independently of the position of rest of said power driven means when the latter is not in operation.

9. In an automatic headlight dimmer adapted for an automobile or the like, a road-illuminating headlight adapted to project a beam of light to illuminate a distant object in advance of the vehicle, an electrical circuit leading thereto, a source of electrical energy connected with said circuit, power driven means for controlling the electrical resistance of said circuit for changing the intensity of illumination of said distant object and having movable means adapted when at rest to maintain said electrical resistance substantially constant and when in operation to automatically vary the resistance thereof, means for controlling the operation of said power driven means, and means for establishing said circuit at a predetermined electrical resistance irrespective of the condition of resistance established by the power driven means when the latter is at rest.

10. In a vehicle having road-illuminating means for illuminating the road in advance of the vehicle, that method of illuminating the road in advance of the moving vehicle which consists in intermittently illuminating so much of the road as is to be traversed by the moving vehicle during the intervening periods of sustaining time duration of less illumination.

11. In a vehicle having road-illuminating means for illuminating the road in advance of the vehicle, that method of illuminating the road in advance of the moving vehicle which consists in regularly and intermittently illuminating for comparatively short periods of time substantially so much of the road as is to be traversed by the vehicle during the comparatively long intervening periods of sustaining time duration of lesser illumination.

12. In a vehicle having road-illuminating means for illuminating the road in advance of the vehicle, means for automatically controlling the illuminating means to intermittently brightly illuminate so much of the road as is to be traversed by the moving vehicle during the intervening periods of sustaining time duration of less illumination.

13. In combination with a conveyance, illuminating means mounted on said conveyance and adapted to project rays of light in the direction of travel, and means operating to intermittently vary the intensity of the light within a maximum and minimum range, the periods of minimum intensity being longer than the periods of maximum intensity and occurring in such sequence as to provide illumination.

14. In combination with a conveyance, electric illuminating means mounted on said conveyance and adapted to project rays of light in the direction of travel of the vehicle, a source of electric energy in circuit with the illuminating means, and means associated with the circuit operating to intermittently change the amount of current flowing through the circuit and thereby vary the intensity of the rays emitted by the illuminating means, the said current changing means being arranged to make the periods of lower intensity longer in duration than the periods of higher intensity, whereby glare of the lights is reduced.

15. In combination with a conveyance, electric illuminating means mounted thereon and adapted to project rays of light in advance of the conveyance and in the path thereof, a source of electric energy in circuit with the illuminating means, an automatic circuit breaker in said circuit for making and breaking said circuit intermittently whereby the intensity of the light is varied over a predetermined range, and a resistance connected to said circuit breaker so that the lights will become dim to a predetermined degree instead of going out.

16. The method of illuminating the path of travel of conveyances which consists in projecting in advance of the conveyance rays of light of such intensity as to produce a glare in the eyes of an observer when viewed from a point near the center of illumination, and regularly and periodically interrupting the projection of said rays at such time intervals as to reduce the glare thereof, the periods of interruption being longer than the periods of projection.

17. Illuminating means for a conveyance comprising means on said conveyance for projecting in the path of travel thereof rays of light of such intensity as to produce a glare when observed from a point near the center of illumination, and means for regularly and periodically interrupting the projection of said rays to reduce the glare thereof, the said interrupting means being constructed and arranged to cause the periods of projection to be less than the periods of interruption.

18. Illuminating means for a conveyance comprising means for projecting rays of light of relatively high intensity in the direction of travel, and means for regularly and periodically substituting for the light of high intensity rays of light of materially less intensity whereby glare of the lights will be reduced.

19. Illuminating means for a conveyance comprising means for projecting rays of light of relatively long range in the direction of travel, means for regularly and periodically substituting for the light of long range rays of light of materially shorter range, the periods of light of shorter range being materially longer than the periods of light of greater range, whereby the predominating effect will be that produced by the light of shorter range.

20. Illuminating means for a conveyance comprising means for projecting rays of light in the direction of travel, means for supplying energy to said projecting means to produce light rays of relatively long range, means for regularly and periodically interrupting the supply of energy and for supplying energy to said projecting means to produce light rays of materially shorter range during the periods of interruption of said first named supply of energy, said light rays of less range being sufficient to illuminate the path of travel.

In testimony whereof I hereto affix my signature.

GEORGE W. LORIMER.